(12) United States Patent
Li et al.

(10) Patent No.: US 12,290,787 B2
(45) Date of Patent: May 6, 2025

(54) LIGHT-DRIVEN FILTRATION ANTIBACTERIAL COMPOSITE MEMBRANE AND PREPARATION METHOD AND USE THEREOF

(71) Applicants: Tiangong University, Tianjin (CN); Minjiang University, Fujian (CN); Tianjin Yuzhan International Trade Co., Ltd., Tianjin (CN)

(72) Inventors: Ting-Ting Li, Tianjin (CN); Lu Yang, Tianjin (CN); Heng Zhang, Tianjin (CN); Bo Gao, Tianjin (CN); Jia-Horng Lin, Tianjin (CN); Ching-Wen Lou, Tianjin (CN)

(73) Assignees: Tiangong University, Tianjin (CN); Minjiang University, Fujian (CN); Tianjin Yuzhan International Trade Co., Ltd., Tianjin (CN)

( * ) Notice: Subject to any disclaimer, the term of this patent is extended or adjusted under 35 U.S.C. 154(b) by 540 days.

(21) Appl. No.: 17/723,220

(22) Filed: Apr. 18, 2022

(65) Prior Publication Data

US 2022/0331746 A1 Oct. 20, 2022

(51) Int. Cl.
*B01D 69/02* (2006.01)
*B01D 67/00* (2006.01)
*B01D 69/12* (2006.01)
*B01D 69/14* (2006.01)
(Continued)

(52) U.S. Cl.
CPC .......... *B01D 69/02* (2013.01); *B01D 67/0011* (2013.01); *B01D 67/002* (2013.01); *B01D 67/0088* (2013.01); *B01D 67/0095* (2013.01); *B01D 69/12* (2013.01); *B01D 69/141* (2013.01); *B01D 71/44* (2013.01); *B01D 71/48* (2013.01); *B01D 2323/08* (2013.01); *B01D 2323/12* (2013.01); *B01D 2323/14* (2013.01); *B01D 2323/26* (2013.01); *B01D 2323/36* (2013.01); *B01D 2323/39* (2013.01); *B01D 2325/48* (2013.01)

(58) Field of Classification Search
None
See application file for complete search history.

(56) References Cited

PUBLICATIONS

Azadeh Ghaee, et al., Preparation of hydrophilic polycaprolactone/modified ZIF-8 nanofibers as a wound dressing using hydrophilic surface modifying macromolecules, Materials Science and Engineering: C, vol. 103, 2019, 109767 (Year: 2019).*

* cited by examiner

*Primary Examiner* — Jason M Greene
*Assistant Examiner* — Eric J McCullough
(74) *Attorney, Agent, or Firm* — Gunn, Lee & Cave, P.C.; Robert L. McRae

(57) ABSTRACT

Disclosed are a light-driven filtration antibacterial composite membrane and a preparation method and use thereof. The method for preparing the light-driven filtration antibacterial composite membrane includes: mixing dichloromethane and N,N-dimethylformamide to obtain a first solution; adding PCL particles to the first solution, and stirring until being uniform to obtain an electrospinning solution; adding a ZIF-8 powder to the electrospinning solution, and ultrasonically dispersing for at least 1 hour to obtain a PCL/ZIF-8 spinning solution; spraying the PCL/ZIF-8 spinning solution onto a PPCL@PDA/TAEG men-blown membrane to obtain the light-driven filtration antibacterial composite membrane.

15 Claims, 9 Drawing Sheets

(51) Int. Cl.
*B01D 71/44* (2006.01)
*B01D 71/48* (2006.01)

LIGHT-DRIVEN FILTRATION ANTIBACTERIAL COMPOSITE MEMBRANE AND PREPARATION METHOD AND USE THEREOF

CROSS REFERENCE TO RELATED APPLICATION

This application claims the benefit and priority of Chinese Patent Application No. 202110420747.2 filed on Apr. 19, 2021, the disclosure of which is incorporated by reference herein in its entirety as part of the present application.

TECHNICAL FIELD

The present disclosure relates to the technical field of antibacterial membranes, in particular to a light-driven filtration antibacterial composite membrane and a preparation method and use thereof.

BACKGROUND ART

As a thorny problem for every country, infectious diseases have a fast spread with a wide route, and thereby are known as a third leading cause of death worldwide. Currently, one of the most serious health care problems in the world is bacterial resistance to traditional antibiotics. In the past years, more and more patients have suffered from various health problems caused by bacteria, even a threat to life. With the increase of drug-resistant bacteria, the disease has become more and more serious. For current medical protective materials, although they are better in terms of comfort, there are still some problems such as weak antibacterial activity and short antibacterial time. Moreover, most antibacterial materials can only work under ultraviolet light or near-infrared light, but not under darkness, while most photosensitizers are not clean enough and the preparation method thereof is cumbersome. Therefore, it is of great significance to prepare a light-driven antibacterial material that could work under both light and darkness without affecting the interception function to pathogenic particles to solve the existing health care problems.

SUMMARY

In view of the deficiencies of the prior art, an object of the present disclosure is to provide a method for preparing a light-driven filtration antibacterial composite membrane.

Another object of the present disclosure is to provide a light-driven filtration antibacterial composite membrane obtained by the above method.

In order to achieve the above objects, the present disclosure provides the following technical solutions.

Provided is a method for preparing a light-driven filtration antibacterial composite membrane, comprising:
  step 1): mixing dichloromethane and N,N-dimethylformamide evenly to obtain a first solution; adding polycaprolactone (PCL) particles to the first solution, and stirring until being uniform to obtain an electrospinning solution; adding a zeolite imidazole framework-8 (ZIF-8) powder to the electrospinning solution, and ultrasonically dispersing for at least 1 hour to obtain a PCL/ZIF-8 spinning solution, in which a volume ratio of dichloromethane to N,N-dimethylformamide is in the range of (1-10):(1-10), a ratio of volume parts of the first solution to mass parts of the PCL particles is in the range of (1-50):(1-10), and the PCL/ZIF-8 spinning solution contains 0.1-1.5 wt % of ZIF-8 powders; and
  step 2): spraying the PCL/ZIF-8 spinning solution onto a PPCL@PDA/TAEG melt-blown membrane to obtain the light-driven filtration antibacterial composite membrane.

In the context of the present disclosure, the mass parts are expressed in units of a gram (g), and the volume parts are expressed in units of a milliliter (mL).

In some embodiments, in step 1), the stirring is performed for 1-5 hours.

In some embodiments, in step 1), the ultrasonically dispersing is performed for 1-10 hours.

In some embodiments, in step 2), the PPCL@PDA/TAEG melt-blown membrane is prepared by a process comprising:
  step (1): preparing a master batch of mixed polypropylene (PP) and PCL, and subjecting the master batch to a membrane-forming treatment by a melt-blown machine to obtain a PPCL melt-blown membrane:
  step (2): mixing tris(hydroxymethyl)aminomethane hydrochloride, dopamine hydrochloride and deionized water to obtain a mixed solution, and adding dropwise 3-aminopropyltriethoxysilane thereto to adjust the mixed solution to have a pH of 8-9 to obtain a polydopamine (PDA) solution; immersing the PPCL melt-blown membrane in the PDA solution for 8-15 hours, taking out, washing and drying to obtain a PPCL@PDA melt-blown membrane (i.e., a membrane formed by growing PDA onto the PPCL melt-blown membrane), in which a ratio of mass parts of tris(hydroxymethyl)aminomethane hydrochloride and mass parts of dopamine hydrochloride and volume parts of deionized water is in the range of (0.05-0.5):(0.05-0.8):(30-150);
  step (3): mixing 4,4'-terephthaloyl diphthalic anhydride (TDPA), polyphosphoric acid and dioxane to obtain a second solution; immersing the PPCL@PDA melt-blown membrane in the second solution at a temperature of 40-100° C. for 0.5-5 hours under stirring, taking out, washing and drying to obtain a PPCL@PDA/TA antibacterial melt-blown membrane, in which a ratio of mass parts of TDPA and mass parts of polyphosphoric acid and volume parts of dioxane is in the range of (0.05-0.5):(0.05-0.5):(5-50); and
  step (4): mixing epigallocatechin gallate (EGCG), polyphosphoric acid and dioxane evenly to obtain a third solution; immersing the PPCL@PDA/TA antibacterial melt-blown membrane in the third solution at a temperature of 40-100° C. for 0.5-5 hours under stirring, taking out, washing and drying to obtain the PPCL@PDA/TAEG melt-blown membrane, in which a ratio of mass parts of EGCG and mass parts of polyphosphoric acid and volume parts of dioxane is in the range of (0.05-0.5):(0.05-0.5):(5-50).

In some embodiments, in step (1), a mass ratio of PP to PCL in the master batch is in the range of (50-90):(5-30).

In some embodiments, the master batch is prepared by a process comprising: drying PP and PCL at a temperature of 10-80° C. for 8-15 hours respectively, adding them into a granulator, mixing, and extruding to obtain the master batch.

In some embodiments, the process for preparing the PPCL@PDA/TAEG melt-blown membrane further comprises in step (1), drying the master batch at a temperature of 10-80° C. for 8-15 hours before the membrane-forming treatment.

In some embodiments, in step (2), the washing is performed by deionized water.

In some embodiments, in step (2), the drying is performed at a temperature of 10-80° C. for 8-15 hours.

In some embodiments, in step (3), the washing is performed by acetone.

In some embodiments, in step (3), the drying is performed at a temperature of 20-80° C. for 0.5-5 hours.

In some embodiments, in step (4), the washing is performed by acetone.

In some embodiments, in step (4), the drying is performed at a temperature of 20-80° C. for 0.5-5 hours.

Also provided is a light-driven filtration antibacterial composite membrane obtained by the method described above.

Further provided is the use of the above light-driven filtration antibacterial composite membrane for improving the filtration efficiency of PM2.5 particles.

Compared with the prior art, the present disclosure has the following beneficial effects:

(1) In the present disclosure, a ZIF-8 powder is added into the electrospinning solution to obtain a PCL/ZIF-8 spinning solution, and the obtained PCL/ZIF-8 spinning solution is sprayed onto the surface of a PPCL@PDA/TAEG melt-blown membrane by electrospinning to form a light-driven filtration antibacterial composite membrane with a beaded structure.

(2) The light-driven filtration antibacterial composite membrane has a filtration efficiency of PM2.5 particles as high as 99.9%.

(3) The PCL/ZIF-8 spinning solution is sprayed onto a PPCL@PDA/TAEG melt-blown membrane by electrospinning, which could increase the rechargeable, storable and antibacterial properties of the composite membrane, resulting in a novel filtration antibacterial composite material.

DETAILED DESCRIPTION OF THE EMBODIMENTS

Figure 1:
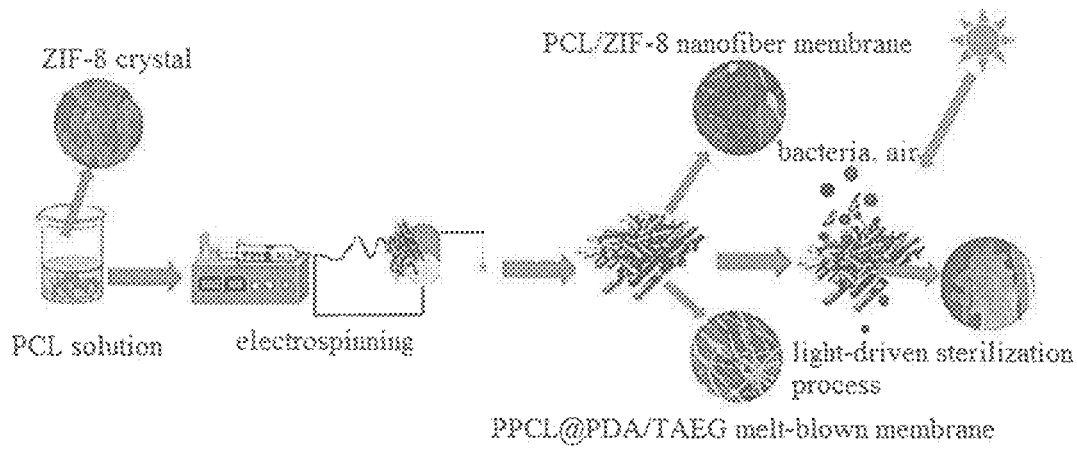
FIG. 1 shows a flow chart of the method for preparing a light-driven filtration antibacterial composite membrane according to one or more embodiments of the present disclosure.

The present disclosure will be described in detail below with reference to the examples.

Zinc nitrate hexahydrate was purchased from Tianjin Damao Chemical Reagent Factory, China. Anhydrous methanol and N,N-dimethylformamide were purchased from Tianjin Bohua Chemical Reagent Co., Ltd., China. Dichloromethane was purchased from Tianjin Fengchuan Chemical Reagent Technology Co., Ltd., China. The above reagents are analytical reagents. 2-methylimidazole was purchased from Aladdin, with a purity of 98%. Polycaprolactone was purchased from Solvay in the United States, with a relative molecular weight of 80,000. The zeolite imidazole framework (ZIF) was prepared in laboratory. *Escherichia coli* and *Staphylococcus aureus* were purchased from Beijing Beina Chuanglian Biotechnology Research Institute, China. The single-screw melt-blown machine was purchased from Tianjin Shengruiyuan Machinery Technology Co., Ltd., China.

In all examples, the mass parts are expressed in units of g, and the volume parts are expressed in units of mL.

Example 1

A light-driven filtration antibacterial composite membrane was prepared as follows:

1) Dichloromethane and N,N-dimethylformamide were mixed obtaining a first solution, and then PCL particles were added into the first solution, the resulting mixture was stirred for 2 hours until being uniform, obtaining an electrospinning solution. Then ZIF-8 powder was added into the electrospinning solution and ultrasonically dispersed for 2 hours, obtaining a PCL/ZIF-8 spinning solution. Wherein, a volume ratio of dichloromethane to N,N-dimethylformamide was 3:1, a ratio of volume parts of the first solution to mass parts of the PCL particles was 20:1.97, and the ZIF-8 powder was contained in the PCL/ZIF-8 spinning solution with a mass fraction of 0.3 wt %.
2) 12 mL of the PCL/ZIF-8 spinning solution was sprayed onto a PPCL@PDA/TAEG melt-blown membrane with an area of 176.71 cm$^2$ by an electrospinning machine, obtaining the light-driven filtration antibacterial composite membrane.

Example 2

A light-driven filtration antibacterial composite membrane was prepared as follows:
1) Dichloromethane and N,N-dimethylformamide were mixed evenly, obtaining a first solution, and then PCL particles were added into the first solution, the resulting mixture was stirred for 2 hours until being uniform, obtaining an electrospinning solution. Then ZIF-8 powder was added into the electrospinning solution, and ultrasonically dispersed for 2 hours, obtaining a PCL/ZIF-8 spinning solution. Wherein, a volume ratio of dichloromethane to N,N-dimethylformamide was 3:1, a ratio of volume parts of the first solution to mass parts of the PCL particles was 20:1.97, and the ZIF-8 powder was contained in the PCL/ZIF-8 spinning solution with a mass fraction of 0.5 wt %.
2) 12 mL of the PCL/ZIF-8 spinning solution was sprayed onto a PPCL@PDA/TAEG melt-blown membrane with an area of 176.71 cm$^2$ by an electrospinning machine, obtaining the light-driven filtration antibacterial composite membrane.

Example 3

A light-driven filtration antibacterial composite membrane was prepared as follows:
1) Dichloromethane and N,N-dimethylformamide were mixed evenly, obtaining a first solution, and then PCL particles were added into the first solution, the resulting mixture was stirred for 2 hours until being uniform, obtaining an electrospinning solution. Then ZIF-8 powder was added into the electrospinning solution, and ultrasonically dispersed for 2 hours, obtaining a PCL/ZIF-8 spinning solution. Wherein, a volume ratio of dichloromethane to N,N-dimethylformamide was 3:1, a ratio of volume parts of the first solution to mass parts of the PCL particles was 20:1.97, and the ZIF-8 powder was contained in the PCL/ZIF-8 spinning solution with a mass fraction of 0.7 wt %.
2) 12 mL of the PCL/ZIF-8 spinning solution was sprayed onto a PPCL@PDA/TAEG melt-blown membrane with an area of 176.71 cm$^2$ by an electrospinning machine, obtaining the light-driven filtration antibacterial composite membrane.

Example 4

A light-driven filtration antibacterial composite membrane was prepared as follows:
1) Dichloromethane and N,N-dimethylformamide were mixed evenly, obtaining a first solution, and then PCL particles were added into the first solution, the resulting mixture was stirred for 2 hours until being uniform, obtaining an electrospinning solution. Then ZIF-8 powder was added into the electrospinning solution, and ultrasonically dispersed for 2 hours, obtaining a PCL/ZIF-8 spinning solution. Wherein, a volume ratio of dichloromethane to N,N-dimethylformamide was 3:1, a ratio of volume parts of the first solution to mass parts of the PCL particles was 20:1.97, and the ZIF-8 powder was contained in the PCL/ZIF-8 spinning solution with a mass fraction of 0.9 wt %.
2) 12 mL of the PCL ZIF-8 spinning solution was sprayed onto a PPCL@PDA/TAEG melt-blown membrane with an area of 176.71 cm$^2$ by an electrospinning machine, obtaining the light-driven filtration antibacterial composite membrane.

Example 5

A light-driven filtration antibacterial composite membrane was prepared as follows:
1) Dichloromethane and N,N-dimethylformamide were mixed evenly, obtaining a first solution, and then PCL particles were added into the first solution, the resulting mixture was stirred for 2 hours until being uniform, obtaining an electrospinning solution. Then ZIF-8 powder was added into the electrospinning solution, and ultrasonically dispersed for 2 hours, obtaining a PCL/ZIF-8 spinning solution. Wherein, a volume ratio of dichloromethane to N,N-dimethylformamide was 3:1, a ratio of volume parts of the first solution to mass parts of the PCL particles was 20:1.97, and the ZIF-8 powder was contained in the PCL/ZIF-8 spinning solution with a mass traction of 0.3 wt %;
2) 12 mL of the PCL/ZIF-8 spinning solution was sprayed onto a PPCL@PDA/TAEG melt-blown membrane with an area of 176.71 cm$^2$ by an electrospinning machine, obtaining the light-driven filtration antibacterial composite membrane.

Example 6

A light-driven filtration antibacterial composite membrane was prepared as follows:
1) Dichloromethane and N,N-dimethylformamide were mixed evenly, obtaining a first solution, and then PCL particles were added into the first solution, the resulting mixture was stirred for 2 hours until being uniform, obtaining an electrospinning solution. Then ZIF-8 powder was added into the electrospinning solution, and ultrasonically dispersed for 2 hours, obtaining a PCL/ZIF-8 spinning solution. Wherein, a volume ratio of dichloromethane, to N,N-dimethylformamide was 3:1, a ratio of volume parts of the first solution to mass parts of the PCL particles was 20:1.48, and the ZIF-8 powder was contained in the PCL/ZIF-8 spinning solution with a mass fraction of 0.3 wt %;
2) 12 mL of the PCL/ZIF-8 spinning solution was sprayed onto a PPCL@PDA/TAEG melt-blown membrane with an area of 176.71 cm$^2$ by an electrospinning machine, obtaining the light-driven filtration antibacterial composite membrane.

Example 7

A light-driven filtration antibacterial composite membrane was prepared as follows:

1) Dichloromethane and N,N-dimethylformamide were mixed evenly, obtaining a first solution, and then PCL particles were added into the first solution, the resulting mixture was stirred for 2 hours until being uniform, obtaining an electrospinning solution. Then ZIF-8 powder was added into the electrospinning solution, and ultrasonically dispersed for 2 hours, obtaining a PCL/ZIF-8 spinning solution. Wherein, a volume ratio of dichloromethane to N,N-dimethylformamide was 3:1, a ratio of volume parts of the first solution to mass parts of the PCL particles was 20:1.48, and the ZIF-8 powder was contained in the PCL/ZIF-8 spinning solution with a mass fraction of 0.5 wt %;
2) 12 mL of the PCL/ZIF-8 spinning solution was sprayed onto a PPCL@PDA/TAEG melt-blown membrane with an area of 176.71 cm$^2$ by an electrospinning machine, obtaining the light-driven filtration antibacterial composite membrane.

Example 8

A light-driven filtration antibacterial composite membrane was prepared as follows:
1) Dichloromethane and N,N-dimethylformamide were mixed evenly, obtaining a first solution, and then PCL particles were added into the first solution, the resulting mixture was stirred for 2 hours until being uniform, obtaining an electrospinning solution. Then ZIF-8 powder was added into the electrospinning solution, and ultrasonically dispersed for 2 hours, obtaining a PCL/ZIF-8 spinning solution. Wherein, a volume ratio of dichloromethane to N,N-dimethylformamide was 3:1, a ratio of volume parts of the first solution to mass parts of the PCL particles was 20:1.48, and the ZIF-8 powder was contained in the PCL/ZIF-8 spinning solution with a mass fraction of 0.7 wt %;
2) 12 mL of the PCL/ZIF-8 spinning solution was sprayed onto a PPCL@PDA/TAEG melt-blown membrane with an area of 176.71 cm$^2$ by an electrospinning machine, obtaining the light-driven filtration antibacterial composite membrane.

Example 9

A light-driven filtration antibacterial composite membrane was prepared as follows:
1) Dichloromethane and N,N-dimethylformamide were mixed evenly, obtaining a first solution, and then PCL particles were added into the first solution, the resulting mixture was stirred for 2 hours until being uniform, obtaining an electrospinning solution. Then ZIF-8 powder was added into the electrospinning solution, and ultrasonically dispersed for 2 hours, obtaining a PCL/ZIF-8 spinning solution. Wherein, a volume ratio of dichloromethane to N,N-dimethylformamide was 3:1, a ratio of volume parts of the first solution to mass parts of the PCL particles was 20:1.48, and the ZIF-8 powder was contained in the PCL/ZIF-8 spinning solution with a mass fraction of 0.9 wt %;
2) 12 mL of the PCL/ZIF-8 spinning solution was sprayed onto a PPCL@PDA/TAEG melt-blown membrane with an area of 176.71 cm$^2$ by an electrospinning machine, obtaining the light-driven filtration antibacterial composite membrane.

Example 10

A light-driven filtration antibacterial composite membrane was prepared as follows:
1) Dichloromethane and N,N-dimethylformamide were mixed evenly, obtaining a first solution, and then PCL particles were added into the first solution, the resulting mixture was stirred for 2 hours until being uniform, obtaining an electrospinning solution. Then ZIF-8 powder was added into the electrospinning solution, and ultrasonically dispersed for 2 hours, obtaining a PCL/ZIF-8 spinning solution. Wherein, a volume ratio of dichloromethane to N,N-dimethylformamide was 3:1, a ratio of volume parts of the first solution to mass parts of the PCL particles was 20:1.48, and the ZIF-8 powder was contained in the PCL/ZIF-8 spinning solution with a mass fraction of 1.1 wt %;
2) 12 mL of the PCL/ZIF-8 spinning solution was sprayed onto a PPCL@PDA/TAEG melt-blown membrane with an area of 176.71 cm$^2$ by an electrospinning machine, obtaining the light-driven filtration antibacterial composite membrane.

Comparative Example 1

An antibacterial composite membrane was prepared as follows:
1) Dichloromethane and N,N-dimethylformamide were mixed evenly, obtaining a first solution, and then PCL particles were added into the first solution, the resulting mixture was stirred for 2 hours until being uniform, obtaining an electrospinning solution. Wherein, a volume ratio of dichloromethane to N,N-dimethylformamide was 3:1, a ratio of volume parts of the first solution to mass parts of the PCL particles was 20:1.48;
2) 12 mL of the electrospinning solution was sprayed onto PPCL@PDA/TAEG melt-blown membrane with an area of 176.71 cm$^2$ by an electrospinning machine, obtaining the antibacterial composite membrane.

In the present disclosure, the PPCL@PDA/TAEG melt-blown membrane was prepared according to the following literature: Ting-Ting Li, Heng Zhang, et al., Daylight-Driven Photosensitive Antibacterial Melt-blown Membranes for Medical Use [J]. Journal of Cleaner Production, 2021, entire of which is incorporated herein by reference. Specifically, the PPCL@PDA/TAEG melt-blown membrane in examples 1-10 and comparative example 1 was prepared as follows:

Step 1, a master batch of mixed PP and PCL was prepared as follows: PP and PCL were dried in a blast drying oven at a temperature of 50° C. for 12 hours respectively, then added into a single-screw granulator, mixed and extruded, obtaining the master batch, wherein a mass ratio of PP to PCL in the master batch was 90:10.

The master batch was dried at a temperature of 50° C. for 12 hours in a blast drying oven and then was prepared into a melt-blown membrane by a single-screw melt-blown machine as follows: the master batch was melted, mixed and pushed forward under the action of shearing force and then was extruded, stretched into strings and collected on a mesh curtain under the action of hot air, obtaining the PPCL melt-blown membrane.

Step 2, tris(hydroxymethyl)aminomethane hydrochloride, dopamine hydrochloride and deionized water were mixed, obtaining a mixed solution, and then 3-aminopropyltriethoxysilane was added dropwise thereto to adjust the mixed solution to have a pH of 8, obtaining a polydopamine solution. The PPCL melt-blown membrane was immersed in the polydopamine solution for 12 hours, taken out, washed with deionized water, and dried at a temperature of 40° C. for 12 hours, obtaining a PPCL@PDA melt-blown membrane. Wherein a ratio of mass parts of tris(hydroxymethyl)aminomethane hydrochloride and mass parts of dopamine hydrochloride and volume parts of deionized water is 0.12:0.2:100.

step 3: TDPA, polyphosphoric acid and dioxane were mixed evenly, obtaining a second solution. Then the PPCL@PDA melt-blown membrane was immersed in the second solution at a temperature of 60° C. for 2 hours under stirring, taken out, washed by acetone, and dried at a temperature of 40° C. for 2 hours in a vacuum drying oven, obtaining a PPCL@PDA/TA antibacterial melt-blown membrane. Wherein a ratio of mass parts of TDPA and mass parts of polyphosphoric acid and volume parts of dioxane is 0.2:0.2:20.

Step 4: EGCG, polyphosphoric acid and dioxane were mixed evenly, obtaining a third solution. Then the PPCL@PDA/TA antibacterial melt-blown membrane was immersed in the third solution at a temperature of 80° C. for 2 hours, taken out, washed by acetone, and dried at a temperature of 40° C. for 2 hours in a vacuum drying oven, obtaining the PPCL@PDA/TAEG melt-blown membrane. Wherein a ratio of mass parts of EGCG and mass parts of polyphosphoric acid and volume parts of dioxane is 0.2:0.2:20.

FIG. 1 shows a flow chart of the method for preparing a light-driven filtration antibacterial composite membrane according to one or more examples of the present disclosure.

Figure 2:
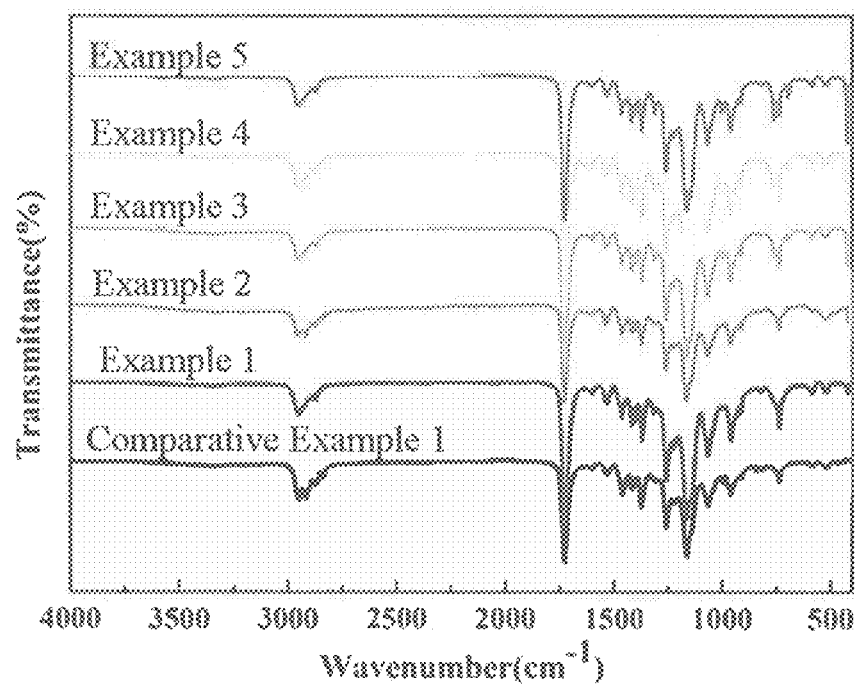
FIG. 2 shows an infrared spectrogram of the light-driven filtration antibacterial composite membranes obtained in examples and the antibacterial composite membrane obtained in comparative example.

FIG. 2 shows an infrared spectrogram of products of examples and comparative example. In the infrared spectrogram, absorption peaks at 1582, 1432, 1310, 1146, 995, 759, 693, and 420 $cm^{-1}$ is attributed to ZIF-8. Compared with comparative example, light-driven filtration antibacterial composite membranes of examples have obvious absorption peaks at 1432, 995, 759, and 420 $cm^{-1}$. From this, it can be seen that ZIF-8 was successfully loaded onto the light-driven filtration antibacterial composite membrane.

Figure 3:
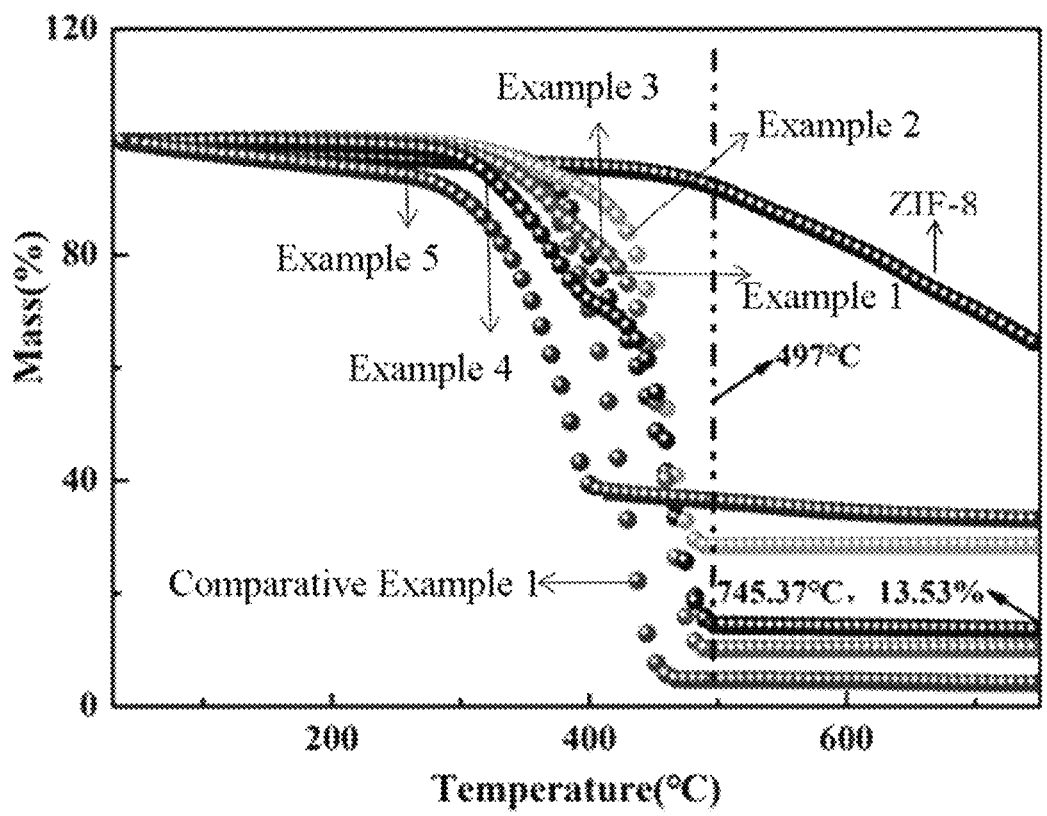
FIG. 3 shows a diagram of thermogravimetric curves of the light-driven filtration antibacterial composite membranes obtained in examples and the antibacterial composite membrane obtained in comparative example.

From FIG. 3, it can be seen that the light-driven filtration antibacterial composite membrane of example 4 has a significantly greater residual mass than the antibacterial composite membrane of comparative example at about 745.3° C., indicating that the light-driven filtration antibacterial composite membrane of example 4 exhibits improved thermal stability by the addition of ZIF-8.

Figure 4:
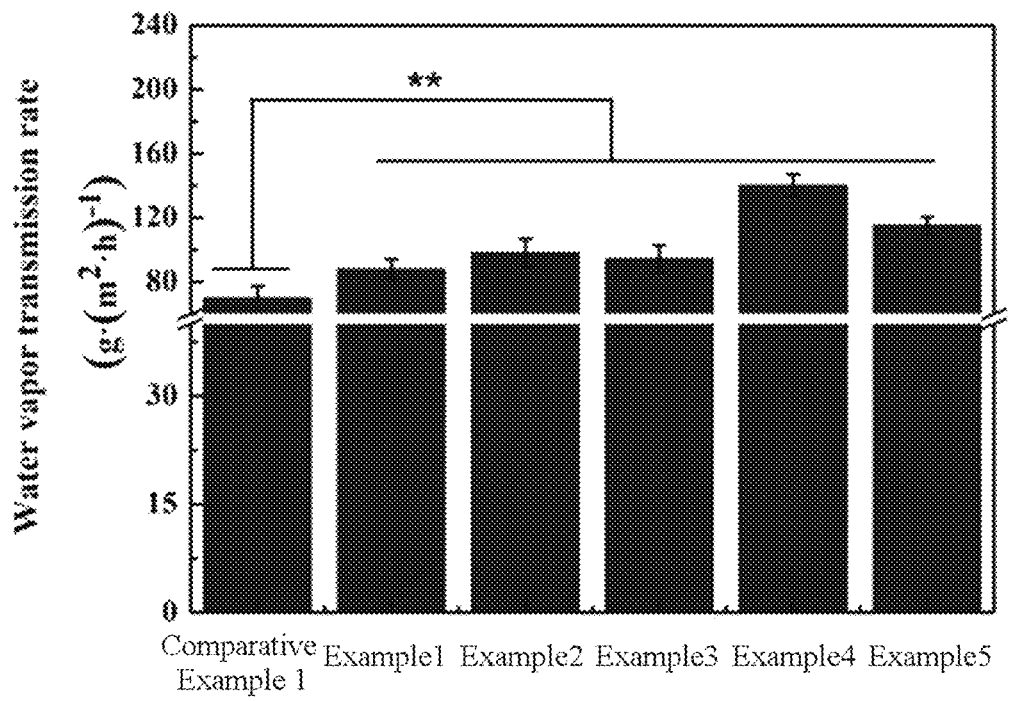
FIG. 4 shows a diagram of the moisture permeability test of the light-driven filtration antibacterial composite membranes obtained in examples and the antibacterial composite membrane obtained in comparative example.

From FIG. 4, it can be seen that in the moisture permeability test, the light-driven filtration antibacterial composite membranes exhibit a good performance of water vapor transmission rate under an environment with a temperature of 38° C. and a relative humidity of 90%. The light-driven filtration antibacterial composite membrane of example 4 has a maximum water vapor transmission rate of 3363.31 $g/(m^2 \cdot d)$, which could meet the requirements of medical protective clothing.

Figure 5:
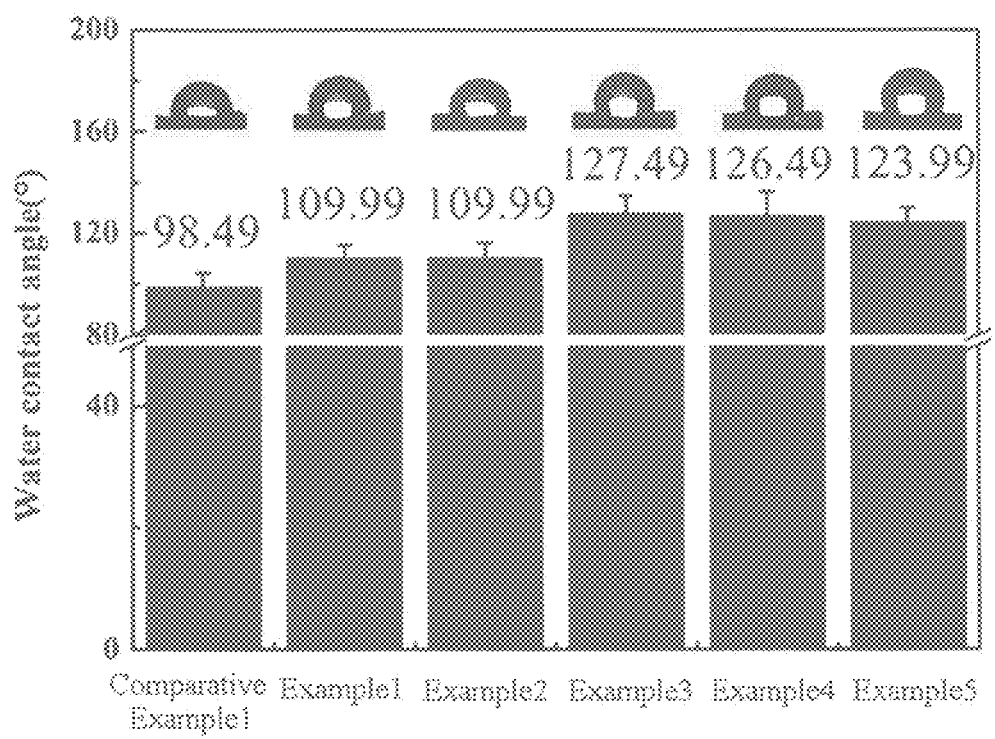
FIG. 5 shows a diagram of water contact angles of the light-driven filtration antibacterial composite membranes obtained in examples and the antibacterial composite membrane obtained in comparative example.

From FIG. 5, it can be seen that the antibacterial composite membrane of comparative example 1 has a minimum contact angle of 98.49°, indicating that the light-driven filtration antibacterial composite membrane has become a hydrophobic material owing to the fact that the addition of ZIF-8 has improved the hydrophilicity of the light-driven filtration antibacterial composite membrane.

Figure 6A:
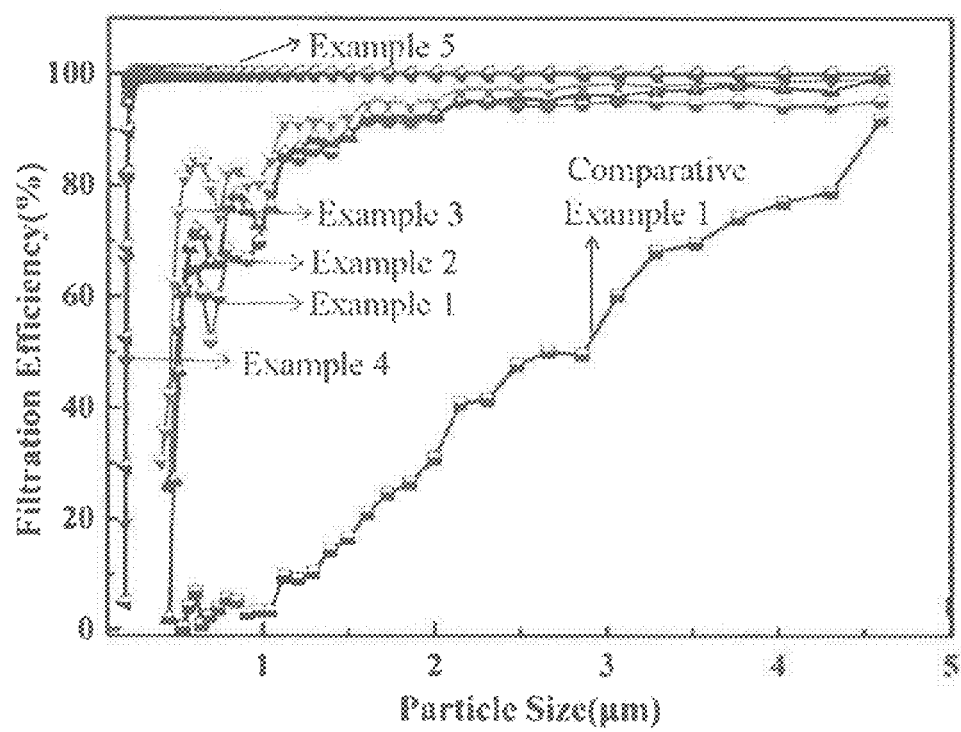
FIG. 6A shows a diagram of filtration efficiency of the light-driven filtration antibacterial composite membranes obtained in examples and the antibacterial composite membrane obtained in comparative example.
Figure 6B:
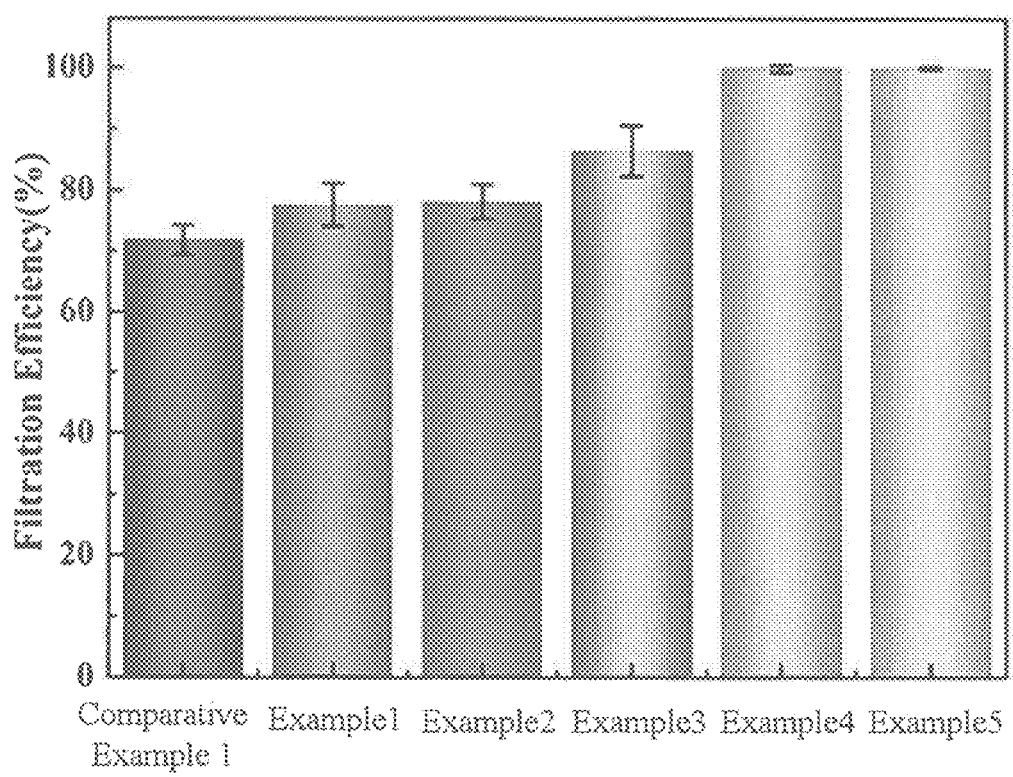
FIG. 6B shows a diagram of filtration efficiency of PM2.5 particles of the light-driven filtration antibacterial composite membranes obtained in examples and the antibacterial composite membrane obtained in comparative example.

From FIG. 6A, it can be seen that with the increasing of the content of ZIF-8, the filtration efficiency and the ability to intercept small molecules of the light-driven filtration antibacterial composite membrane increase. When the content of ZIF-8 is increased to 0.9 wt %, the light-driven filtration antibacterial composite membrane of example 4 has an interception efficiency of 99.9% or more for ultrafine particles with a diameter of greater than 500 nm. From FIG. 6B, it can be seen that the light-driven filtration antibacterial composite membranes of examples have an increased filtration efficiency, and the light-driven filtration antibacterial composite membrane of example 4 has a filtration efficiency up to 99.99%.

Figure 7:
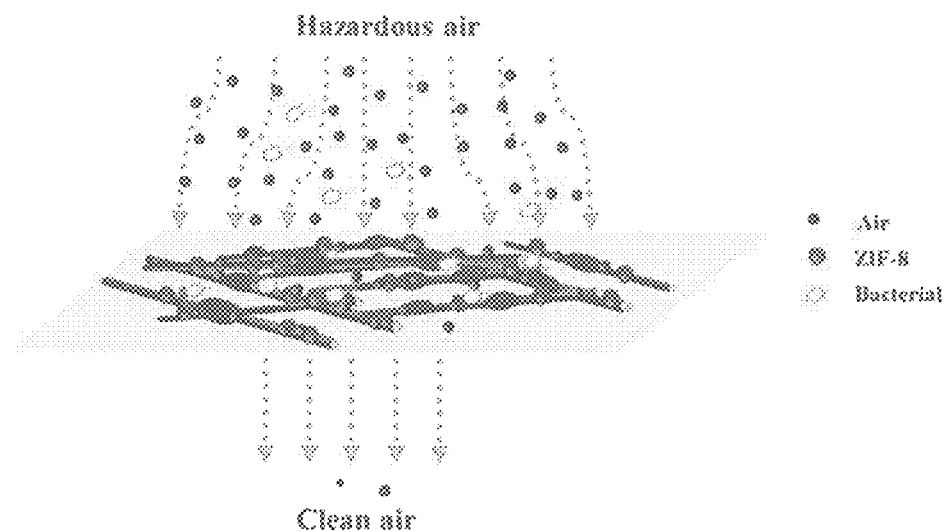
FIG. 7 shows a schematic diagram of a beaded filter for air filtration.

FIG. 7 shows a beaded filter, which is helpful to intercept germs and air impurities, and nanobeads could reduce packing density and resistance of the filter.

Figure 8:
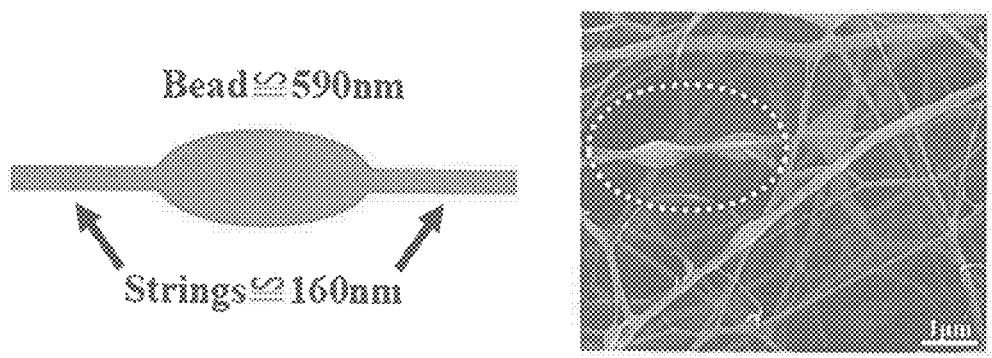
FIG. 8 shows a schematic diagram of the beaded structure and a scanning electron microscope image of the light-driven filtration antibacterial composite membrane obtained in example 4.

FIG. 8 shows a schematic diagram of the beaded structure and a scanning electron microscope image of the light-driven filtration antibacterial composite membrane.

Figure 9A:
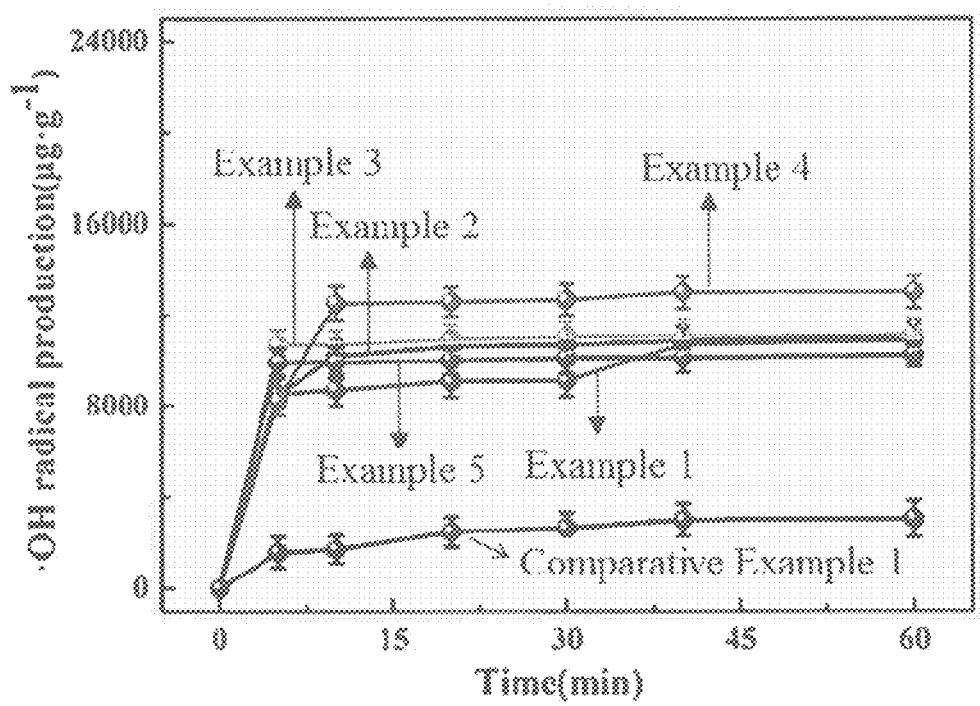
FIG. 9A shows a diagram of concentrations of ·OH produced by the light-driven filtration antibacterial composite membranes obtained in examples and the antibacterial composite membrane obtained in comparative example under darkness after being exposed to light for 1 hour.
Figure 9B:
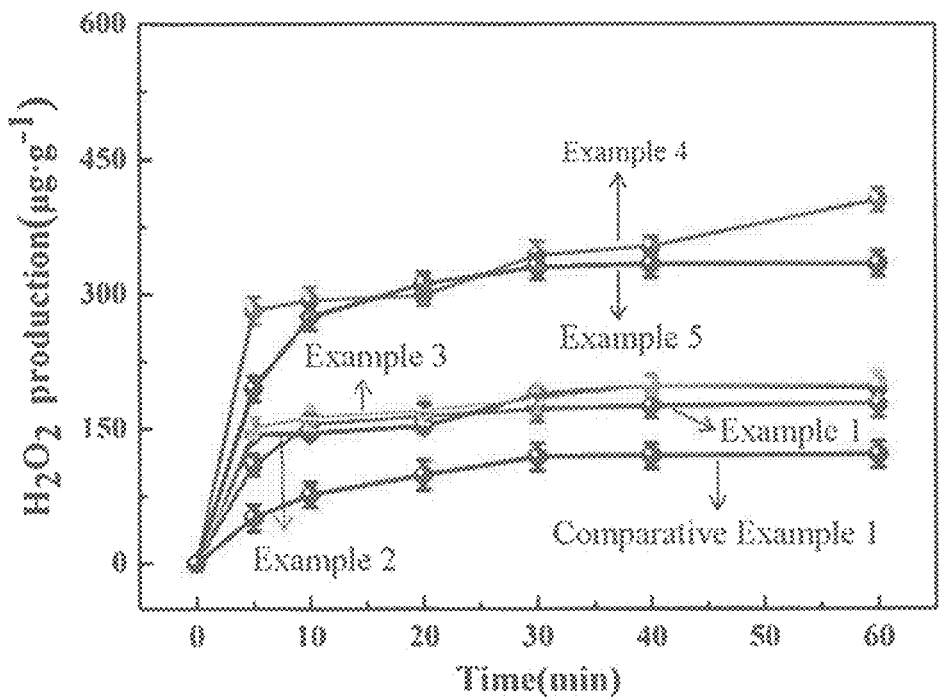
FIG. 9B shows a diagram of concentrations of $H_2O_2$ produced by the light-driven filtration antibacterial composite membranes obtained in examples and the antibacterial composite membrane obtained in comparative example under darkness after being exposed to light for 1 hour.

FIG. 9A shows a diagram of concentration of ·OH produced by the light-driven filtration antibacterial composite membranes obtained in examples and the antibacterial composite membrane obtained in comparative example under darkness after being exposed to light for 1 hour FIG. 9B shows a diagram of concentration of $H_2O_2$ produced by the light-driven filtration antibacterial composite membranes obtained in examples and the antibacterial composite membrane obtained in comparative example under darkness after being exposed to light for 1 hour. As can be seen, the light-driven filtration antibacterial composite membrane of example 4 exhibits the largest electric capacity and has a produced amount of ·OH and $H_2O_2$ of 13009.41 µg/g and 405.72 µg/g respectively, corresponding to a charging rate of 216.82 and 6.76 $µg \cdot g^{-1} \cdot min^{-1}$ respectively, showing that the light-driven filtration antibacterial composite membrane has a high utilization rate of light energy.

Figure 10A:
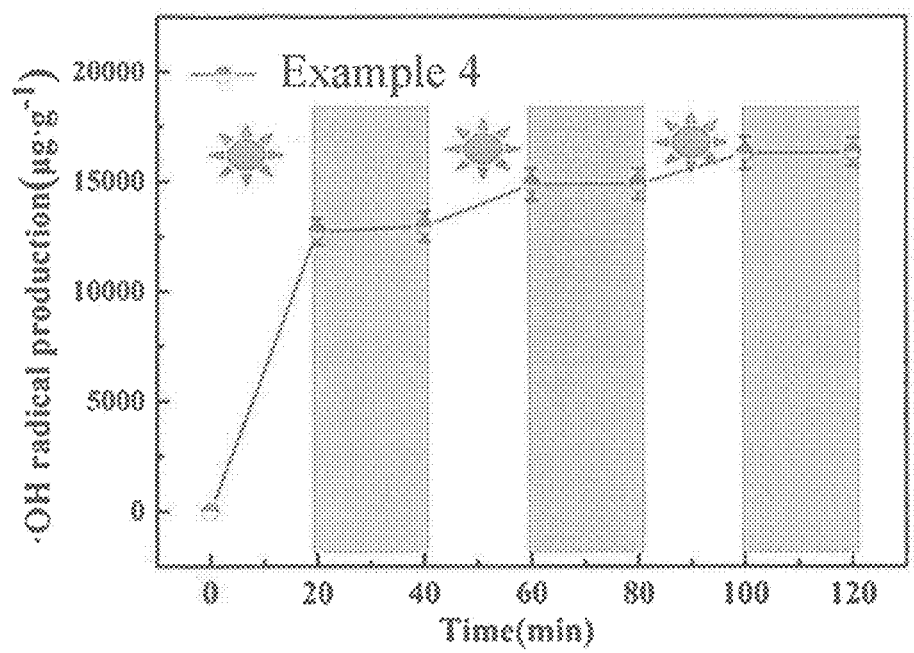
FIG. 10A shows a diagram of the ·OH concentration of the light-driven filtration antibacterial composite membranes obtained in examples and the antibacterial composite membrane obtained in comparative example as a function of time.
Figure 10B:
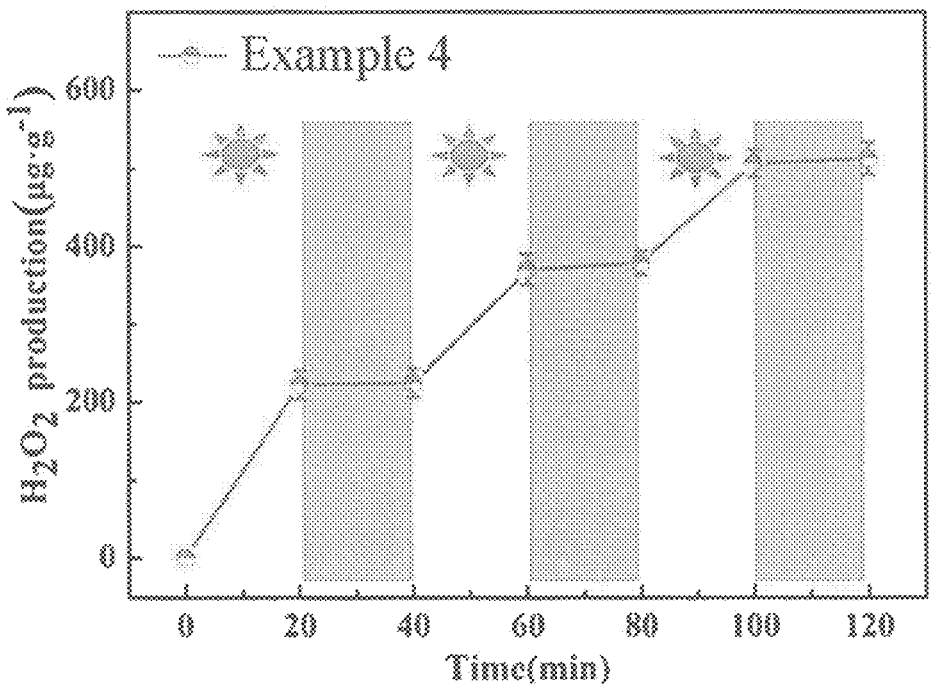
FIG. 10B shows a diagram of the $H_2O_2$ concentration of the light-driven filtration antibacterial composite membranes obtained in examples and the antibacterial composite membrane obtained in comparative example as a function of time.

FIG. 10A and FIG. 10B show diagrams of concentrations of ·OH (FIG. 10A) and $H_2O_2$ (FIG. 10B) of the light-driven filtration antibacterial composite membranes obtained in examples and the antibacterial composite membrane obtained in comparative example under repeated light and darkness as a function of time (in which the white column represents the light condition, and the gray column represents the darkness condition). From FIG. 10A and FIG. 10B, it can be seen that ·OH and $H_2O_2$ were produced during light and not produced in darkness. However, the activity of the light-driven filtration antibacterial composite membranes does not decrease, and the amount of ·OH and $H_2O_2$ increases steadily after being exposed to light.

Figure 11:
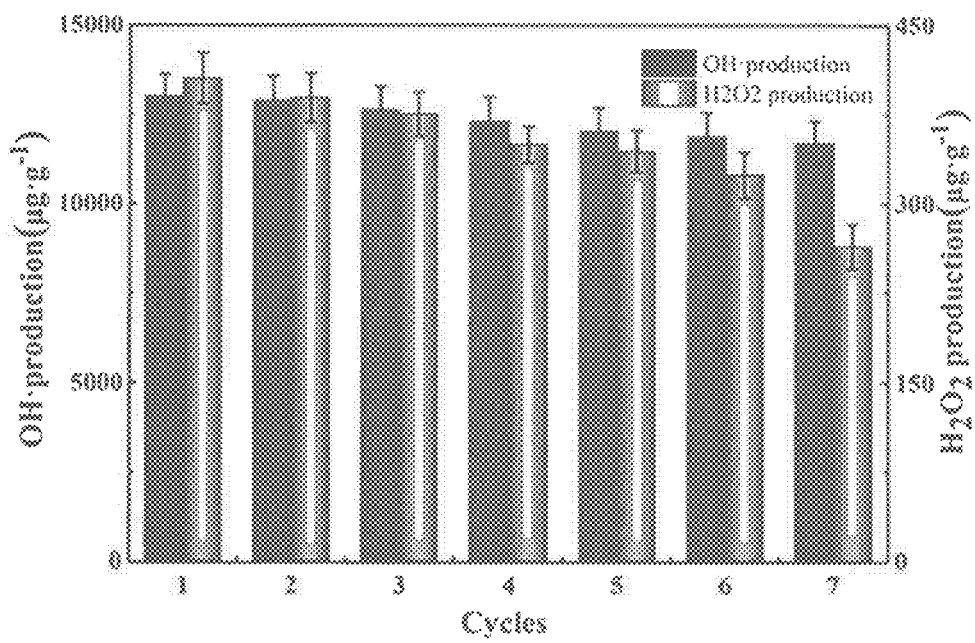
FIG. 11 shows a diagram of chargeability of the light-driven filtration antibacterial composite membrane obtained in example 4 evaluated by repeatedly charging and quenching for seven cycles.

FIG. 11 shows a diagram of chargeability of the light-driven filtration antibacterial composite membrane evaluated by repeatedly charging and quenching for seven cycles. First, the light-driven filtration antibacterial composite membrane was irradiated for 1 hour under light, and then quenched with 0.1 mol/L thiosulfate aqueous solution, which would destroy the structure of benzophenone. Then, the light-driven filtration antibacterial composite membrane was irradiated for 1 hour under light again, and then quenched with excessive thiosulfate aqueous solution. After seven cycles as such, no significant decrease in charging capacity was observed. That is, the light-driven filtration antibacterial composite membrane obtained in example 4 maintains 89.9% of ·OH and 65.1% of $H_2O_2$ originally produced, showing that the light-driven filtration antibacterial composite membrane could be used as a medical protective material for repeated use.

Figure 12A:
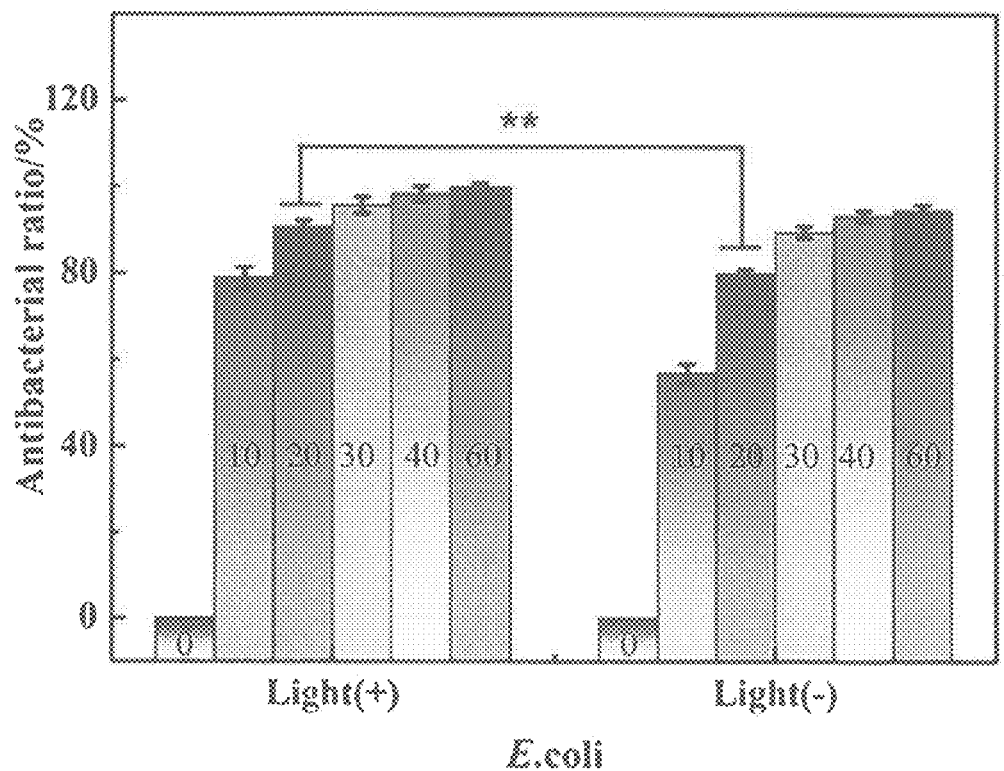
FIG. 12A shows a diagram of antibacterial ratio of the light-driven filtration antibacterial composite membrane obtained in example 4 after contacting and culturing with *E. coli* for 0 min, 10 min, 20 min, 30 min, 40 min, and 60 min under darkness and light respectively.
Figure 12B:
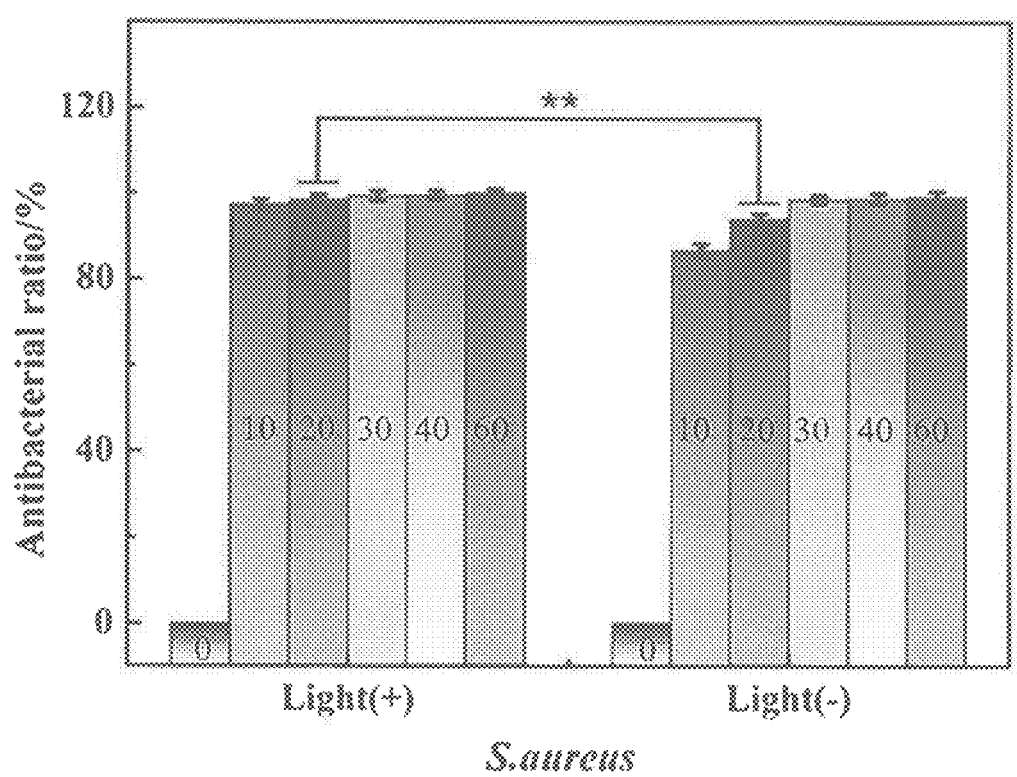
FIG. 12B shows a diagram of antibacterial ratio of the light-driven filtration antibacterial composite membrane obtained in example 4 after contacting and culturing with *S. aureus* for 0 min, 10 min, 20 min, 30 min, 40 min, and 60 min under darkness and light respectively.

FIG. 12A and FIG. 12B show diagrams of antibacterial ratio of the light-driven filtration antibacterial composite membrane obtained in example 4 after contacting and culturing with *E. coli* and *S. aureus* for 0 min, 10 min, 20 min, 30 min, 40 min, and 60 min under darkness (Light (−)) and light (Light (+)). In order to evaluate the activity of the light-driven filtration antibacterial composite membrane, two typical strains, Gram-negative *Escherichia coli* and Gram-positive *Staphylococcus aureus*, were used to attack the surface of the light-driven filtration antibacterial composite membrane. From FIG. 12A and FIG. 12B, it can be seen that no matter in light or darkness, the light-driven filtration antibacterial composite membrane has a higher bactericidal ratio against Gram-positive *Staphylococcus aureus* (*S. aureus*) than Gram-negative *Escherichia coli* (*E. coli*) within the same contact time. In addition, the light-driven filtration antibacterial composite membrane has a bactericidal ratio of 99% or higher for *S. aureus* when contacted with it for 30 minutes under light, showing that the light-driven filtration antibacterial composite membrane has a higher bactericidal rate for *S. aureus*, and is more sensitive to Gram-positive bacteria. Although the light-driven filtration antibacterial composite membrane has a lower bactericidal rate for *E. coli*, it has a bactericidal ratio of 95% or higher with the increase of contact time.

The present disclosure has been exemplarily described above. It should be noted that, without departing from the scope of the present disclosure, any simple variants, modifications, or equivalent replacements that could be made by those skilled in the art without any creative effort shall fall within the protection scope of the present disclosure.

What is claimed is:

1. A method for preparing a light-driven filtration antibacterial composite membrane, comprising:
    step 1): mixing dichloromethane and N,N-dimethylformamide evenly to obtain a first solution; adding polycaprolactone (PCL) particles to the first solution, and stirring until being uniform to obtain an electrospinning solution; adding a zeolite imidazole framework-8 (ZIF-8) powder to the electrospinning solution, and ultrasonically dispersing for at least 1 hour to obtain a PCL/ZIF-8 spinning solution, wherein a volume ratio of dichloromethane to N,N-dimethylformamide is in the range of (1-10):(1-10), a ratio of volume parts of the first solution to mass parts of the polycaprolactone particles is in the range of (1-50):(1-10), and the PCL/ZIF-8 spinning solution contains 0.1-1.5 wt % of the ZIF-8 powder; and
    step 2): spraying the PCL/ZIF-8 spinning solution onto a PPCL@PDA/TAEG melt-blown membrane to obtain the light-driven filtration antibacterial composite membrane;
    wherein the PPCL@PDA/TAEG melt-blown membrane is prepared by a process comprising:
    step (1): preparing a master batch of mixed polypropylene and polycaprolactone, and subjecting the master batch to a membrane-forming treatment by a melt-blown machine to obtain a melt-blown membrane;
    step (2): mixing tris(hydroxymethyl)aminomethane hydrochloride, dopamine hydrochloride and deionized water to obtain a mixed solution, and adding dropwise 3-aminopropyltriethoxysilane thereto to adjust the mixed solution to have a pH of 8-9, to obtain a polydopamine solution; immersing the melt-blown membrane in the polydopamine (PDA) for 8-15 hours, taking out, washing and drying to obtain a PPCL@PDA melt-blown membrane, wherein a ratio of mass parts of tris(hydroxymethyl)aminomethane hydrochloride and mass parts of dopamine hydrochloride and volume parts of deionized water is in the range of (0.05-0.5):(0.05-0.8):(30-150);
    step (3): mixing 4,4'-terephthaloyl diphthalic anhydride, polyphosphoric acid and dioxane evenly to obtain a second solution; immersing the PPCL@PDA melt-blown membrane in the second solution at a temperature of 40-100° C. for 0.5-5 hours under stirring, taking out, washing and drying to obtain a PPCL@PDA/TA antibacterial melt-blown membrane, wherein a ratio of mass parts of 4,4'-terephthaloyl diphthalic anhydride and mass parts of polyphosphoric acid and volume parts of dioxane is in the range of (0.05-0.5):(0.05-0.5):(5-50); and
    step (4): mixing epigallocatechin gallate, polyphosphoric acid and dioxane evenly to obtain a third solution, and immersing the PPCL@PDA/TA antibacterial melt-blown membrane in the third solution at a temperature of 40-100° C. for 0.5-5 hours under stirring, taking out, washing and drying to obtain the PPCL@PDA/TAEG melt-blown membrane, wherein a ratio of mass parts of epigallocatechin gallate and mass parts of polyphosphoric acid and volume parts of dioxane is in the range of (0.05-0.5):(0.05-0.5):(5-50).

2. The method of claim 1, wherein in step (1), a mass ratio of polypropylene to polycaprolactone in the master batch is in the range of (50-90):(5-30);
    the master batch is prepared by a process comprising:
    drying polypropylene and polycaprolactone at a temperature of 10-80° C. for 8-15 hours respectively, adding them into a granulator, mixing, and extruding to obtain the master batch; and
    the process for preparing the PPCL@PDA/TAEG melt-blown membrane further comprises drying the master batch at a temperature of 10-80° C. for 8-15 hours before the membrane-forming treatment.

3. The method of claim 1, wherein in step (2), the washing is performed by deionized water; and
    in step (2), the drying is performed at a temperature of 10-80° C. for 8-15 hours.

4. The method of claim 1, wherein in step (3), the washing is performed by acetone;
    in step (3), the drying is performed at a temperature of 20-80° C. for 0.5-5 hours;
    in step (4), the washing is performed by acetone; and
    in step (4), the drying is performed at a temperature of 20-80° C. for 0.5-5 hours.

5. The method of claim 1, wherein the mass parts are expressed in units of a gram (g), and the volume parts are expressed in units of a milliliter (mL).

6. The method of claim 1, wherein in step 1), the stirring is performed for 1-5 hours.

7. The method of claim 1, wherein in step 1), the ultrasonically dispersing is performed for 1-10 hours.

8. A light-driven filtration antibacterial composite membrane obtained by the method of claim 1.

9. The light-driven filtration antibacterial composite membrane of claim 8, wherein in step (1), a mass ratio of polypropylene to polycaprolactone in the master batch is in the range of (50-90):(5-30);
    the master batch is prepared by a process comprising:
    drying polypropylene and polycaprolactone at a temperature of 10-80° C. for 8-15 hours respectively, adding them into a granulator, mixing, and extruding to obtain the master batch; and
    the process for preparing the PPCL@PDA/TAEG melt-blown membrane further comprises drying the master batch at a temperature of 10-80° C. for 8-15 hours before the membrane-forming treatment.

10. The light-driven filtration antibacterial composite membrane of claim 8, wherein in step (2), the washing is performed by deionized water; and
    in step (2), the drying is performed at a temperature of 10-80° C. for 8-15 hours.

11. The light-driven filtration antibacterial composite membrane of claim 8, wherein in step (3), the washing is performed by acetone;
  in step (3), the drying is performed at a temperature of 20-80° C. for 0.5-5 hours;
  in step (4), the washing is performed by acetone; and
  in step (4), the drying is performed at a temperature of 20-80° C. for 0.5-5 hours.

12. The light-driven filtration antibacterial composite membrane of claim 8, wherein the mass parts are expressed in units of a gram (g), and the volume parts are expressed in units of a milliliter (mL).

13. The light-driven filtration antibacterial composite membrane of claim 8, wherein in step 1), the stirring is performed for 1-5 hours.

14. The light-driven filtration antibacterial composite membrane of claim 8, wherein in step 1), the ultrasonically dispersing is performed for 1-10 hours.

15. A method for improving a filtration efficiency of PM2.5 particles, comprising using the light-driven filtration antibacterial composite membrane of claim 8 to intercept the PM2.5 particles so as to improve its filtration efficiency.

\* \* \* \* \*